United States Patent
Devan et al.

(10) Patent No.: US 11,194,774 B1
(45) Date of Patent: Dec. 7, 2021

(54) SYSTEMS AND METHODS FOR LOGICALLY COPYING DATA FROM A SOURCE DATABASE TO ONE OR MORE TARGET DATABASES

(71) Applicant: salesforce.com, Inc., San Francisco, CA (US)

(72) Inventors: Kamalakkannan Guru Devan, Singapore (SG); Mukesh Burgupalli, Mountain View, CA (US); JithendraNadh Kottapalli, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/947,136

(22) Filed: Jul. 20, 2020

(51) Int. Cl.
  *G06F 16/00* (2019.01)
  *G06F 16/21* (2019.01)
  *G06F 16/27* (2019.01)
  *G06F 16/17* (2019.01)
  *G06F 16/2457* (2019.01)
  *G06F 16/22* (2019.01)

(52) U.S. Cl.
  CPC ........ *G06F 16/214* (2019.01); *G06F 16/1734* (2019.01); *G06F 16/2282* (2019.01); *G06F 16/24573* (2019.01); *G06F 16/278* (2019.01)

(58) Field of Classification Search
  CPC ............... G06F 16/1734; G06F 16/214; G06F 16/2282; G06F 16/24573; G06F 16/278
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Diedra McQuitery
(74) *Attorney, Agent, or Firm* — LKGlobal | Lorenz & Kopf, LLP

(57) ABSTRACT

A system and method are provided for logically copying data from a source database to a first target database and a second target database. Based on table partition information, the source database is queried to collect partition metadata information for a first set of partitions and a second set of partitions. A first set of the partition metadata information for the first set of partitions and a second set of the partition metadata information for the second set of partitions can be used to create at least one extent chunk for each partition of a table. The source database can be queried, based on a first set of extent chunks and a second set of extent chunks, for a first set of data to be written to the first target database and a second set of data from the source database to be written to the second target database.

20 Claims, 11 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,003,531 B2 * | 2/2006 | Holenstein .......... G06F 16/2343 |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobsen |
| 8,015,495 B2 | 9/2011 | Achacoso et al. |
| 8,032,297 B2 | 10/2011 | Jakobsen |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2008/0270461 A1* | 10/2008 | Gordon ................. G06F 3/0667 |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0193003 A1* | 7/2017 | Vijayan ................. G06F 3/0683 |
| 2018/0089262 A1* | 3/2018 | Bhattacharjee ... G06F 16/24532 |
| 2018/0124157 A1* | 5/2018 | Gao ..................... G06F 3/0607 |

\* cited by examiner

RowID Format

| ⌐510 | ⌐520 | ⌐530 | ⌐540 |
|---|---|---|---|
| 000000 | FFF | BBBBBB | RRR |
| Data Object ID | Relative File No | Block Number | Row Number |

RowID Range Creation Algorithm

```
dbms_rowid.ROWID_CREATE
( /* rowid_type / 1,
/ object_number/ data_object_id,
/ relative_fno/ relative_fno,
/ block_number/ block_id,
/ row_number/0) start_rowid,
```
⎬ 610

```
dbms_rowid.ROWID_CREATE
( / rowid_type /1,
/ object_number/ data_object_id,
/ relative_fno/ relative_fno,
/ block_number/ block_id+blocks-1,
/ row_number*/ 10000) end_rowid,
```
⎬ 620

FIG. 6

SYSTEMS AND METHODS FOR LOGICALLY COPYING DATA FROM A SOURCE DATABASE TO ONE OR MORE TARGET DATABASES

TECHNICAL FIELD

Embodiments of the subject matter described herein relate generally to cloud-based computing. More particularly, embodiments of the subject matter relate to logically copying data from a source database to target database(s).

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider.

A database server instance may contain multiple databases. A database is a logical container for data and related objects. A relational database stores data in tables, and can include any number of tables. Each table includes columns and rows. In other words, a table can be viewed as a collection of rows, all with a similar set of columns, that are used to store data in an organized format. When a table is created, columns are created, where each column has a data type associated with it. A data type represents the type of data that each column can hold. Columns describe the specific pieces of information in the table (e.g., names of fields). A row is a collection of attributes that describe an entity, and therefore, a table can be viewed as a collection of rows with the same attribute types. Each row stores the actual, corresponding data. The intersection of a column and a row can be referred to as a record Databases sizes in many cloud computing platforms can be very large (e.g., on the order of terabytes or more). In some cases, it is necessary to migrate or replicate data from a source database (e.g., at one platform/pod) to other target databases (e.g., at another platform/pod). Conventional recovery manager (RMAN) physical copy methodologies are one example of a replication technology that can be used for this purpose.

Current methodologies for copying data from a source database to target database(s) are slow and/or inefficient. As such, it would be desirable to provide technologies for logically copying data from a source database to target database(s) in a fast and efficient manner. The discussion above is merely provided for general background information and is not intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a database logical structure that illustrates a RowID format that includes some of the partition metadata information in accordance with the disclosed embodiments.

FIG. 6 is a method for creating RowID ranges in accordance with the disclosed embodiments.

DETAILED DESCRIPTION

Figure 1:
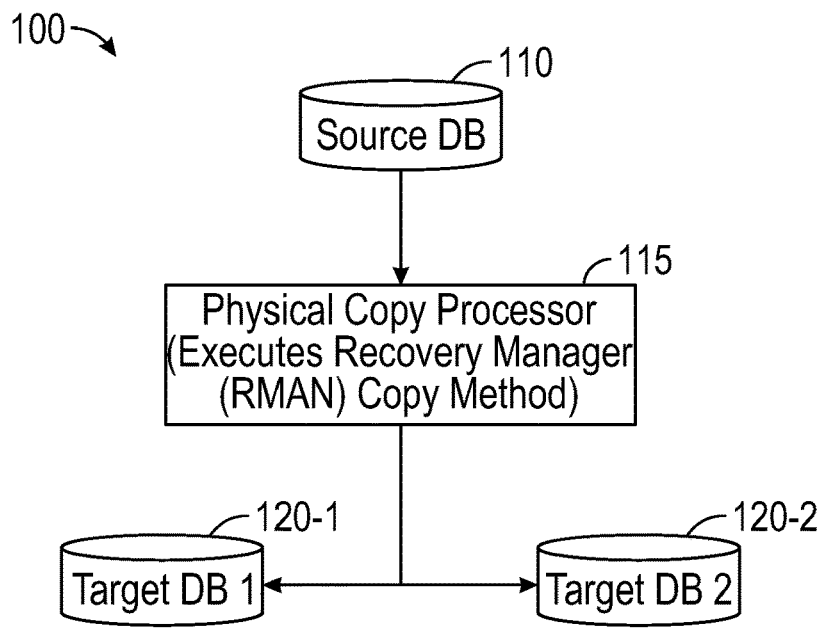
FIG. 1 is a block diagram that illustrates a conventional recovery manager (RMAN) physical copy methodology that is part of an instance refresh process.

As noted above, current methodologies for copying data from a source database to target database(s) are slow and/or inefficient. FIG. 1 is a block diagram 100 that illustrates a conventional recovery manager (RMAN) physical copy methodology that is part of an instance refresh process. An instance refresh process can refer to splitting/migrating a source database (e.g., of Salesforce customer data) into one or more target databases. As two non-limiting examples of conditions for initiating the instance refresh process could be, for example, when source database hardware has reached its end-of-life, or when the source database instance has run out of compute or storage capacity.

A processor 115 executes the RMAN physical copy method to copy data from a source database 110 (e.g., at one pod) to two or more target databases 120 (e.g., at other pods). The RMAN physical copy method executed by the processor 215 includes preparing the databases, and then initiating the RMAN physical copy process. For example, the source database 110 and target databases 120 are prepared by confirming that a connection between the source database 110 to target databases 120 is working acceptably, and then the RMAN physical copy method is used to copy the files from source database 110 to both targets databases 120.

One drawback of the RMAN physical copy technology is that it employs a two-way instance refresh mechanism in which, close or near to 100% of data, is physically copied from a source database to two or more respective target databases using partition mapping. For instance, in the case where data is being copied to two target databases, this process happens even though only 50% of the data needs to be copied to each of the respective target databases. As such, too much storage space is consumed at the target databases. In addition, there is no way to filter the data that is copied to each target database in a fast and efficient manner. To explain further, when the RMAN physical copy methodologies are used to copy data, there is no way to filter out the data from the source database at the table/partition level. As such, even though all of the data from the source database 110 does not need to be copied to both of the target databases 120, all of the data from the source database 110 is copied to both of the target databases 120. As such, both of the target databases 120 must have at least the same amount of storage space allocated as the source database 110.

Another disadvantage is fragmentation. The RMAN physical copy method is a file-based copy method in which datafiles will copy to the target databases without any change (e.g., meaning that they are the same size as they are at the source database). As such, whatever fragmented data exists on the source database will be same as that at the target databases. For example, tables and indexes that are fragmented in datafiles at source database will also be fragmented in datafiles at the target databases. As a result, using the RMAN physical copy method will result in each of the target databases being the same size as the source database.

Yet another disadvantage of this approach is that copying results in downtime for customers while all data from the source database 110 is being copied to both of the target databases 120, and during that maintenance window unwanted data must be maintained thus increasing down time for customers.

As such, it would be desirable to provide technologies for logically copying data from a source database to target database(s) in a fast and efficient manner. It would be desirable to provide technologies for logically copying only "necessary" partition data from the source database 110 to the target databases 120 (e.g., where the necessary partition data is actual database data from the source database 110 such as customer data from the source database 110).

The exemplary embodiments presented herein relate to logically copying data from a source database to one or more target databases. For example, the described subject matter can be implemented in the context of any cloud-based computing environment including, for example, a multi-tenant database system. In one embodiment, a database migration system and related methodologies are provided for logically copying data from a source database to one or more target databases. The source database comprises a table having a plurality of partitions (e.g., each table can be split or partitioned into a number (1 . . . N) of partitions). Each partition can include multiple extents within that partition. In one non-limiting embodiment, the target databases, such as, a first target database and a second target database, a processor of the database migration system can be provided with partition information that specifies, for example, a first set of partitions from the source database that are to be copied to the first target database, and a second set of partitions from the source database that are to be copied to the second target database. The processor can collect, based on partition input arguments, table partition information that indicates the first set of partitions are to be copied to the first target database and the second set of partitions are to be copied to the second target database. The partition input arguments can include, for example, a first set of partition numbers that will be assigned to the first target database; and a second set of partition numbers that will be assigned to the second target database.

Based on the table partition information, the processor can query the source database to collect partition metadata information for the first set of partitions and the second set of partitions, and store a first set of the partition metadata information for the first set of partitions at the first target database, and a second set of the partition metadata information for the second set of partitions at the second target database. In one embodiment, each instance of the partition metadata information can include, for example, a table name, a partition name, an object ID, a file number, a block number, and a row number.

Based on the partition metadata information, at least one extent chunk can be created for each partition of a table. Each extent chunk can include a set or group of extents. In one embodiment, each extent chunk can be computed by computing the value of the starting row identifier for that extent chunk, and computing the value of the ending row identifier for that extent chunk.

For example, in one embodiment, for each of the first set of partitions, the first set of extent chunks can be created based on the first set of the partition metadata information, and for each of the second set of partitions, the second set of extent chunks can be created based on the second set of the partition metadata information.

Each extent chunk can include a group of extents specified by a range of row identifiers (IDs) that is specified, for example, by a value of a starting row identifier and a value of an ending row identifier for that extent chunk. In one embodiment, each row identifier has a format comprising: an object ID, a file number, a block number, and a row number.

In one embodiment, the first target database can query the source database, based on a first set of extent chunks, for a first set of data from the source database, and write the first set of data to the first target database. Similarly, the second target database can query the source database, based on a second set of extent chunks, for a second set of data from the source database, and write the second set of data to the second target database. For example, in one implementation, each table of a first set of tables has a subset of related extent chunks from the first set of extent chunks, and for each table of the first set of tables, a thread of a multi-thread processor can process each related extent chunk (of the subset of related extent chunks associated with that table) by: querying the source database for particular data in a range of row identifiers specified by that related extent chunk; and writing the particular data to the first target database. Collectively the multi-thread processor can multi-thread process all of the first set of extent chunks in parallel to copy the first set of data from the source database to the first target database. The first set of data from the source database comprises all of the particular data in the range of row identifiers specified by each related extent chunk of the subset of related extent chunks.

The disclosed systems and methods for logically copying data from a source database to one or more target databases can provide a number of improvements in contrast to physical copy methods. For example, one advantage of the disclosed systems and methods for logically copying data is that only "necessary" data is copied from a source database to each target database (based on partition input arguments). As such, the amount of data copied to each target database is less, and storage space is drastically reduced. Yet another advantage of the disclosed systems and methods for logically copying data is that it fully supports partition input arguments to copy customer data. The partition input arguments (e.g., partition numbers) can be configured and specified by whoever runs the automation. Another advantage of the disclosed systems and methods for logically copying data is that target databases (that data is being migrated to) can be smaller in size making it easy to migrate data from large database platforms to smaller database platforms.

Another advantage of the disclosed systems and methods for logically copying data is that since it is a logical copy, fragmentation at the target databases is not an issue. To explain further, by logically copying data, fresh data blocks, which are allocated in contiguous manner, are written to target databases so there is no chance of fragmentation at the target databases. Hence database performance will be improved.

Still another advantage of the disclosed systems and methods for logically copying data is that data is chunked into separate parts and copied in parallel. As such, less data is copied from the source database to each target database (e.g., only necessary data for each target database), and the rate at which it is copied is faster because extent chunks are processed in parallel using multi-thread processing, which helps increase speed. Thus, this method is very fast when compare to other copy methodologies.

Another advantage of the disclosed systems and methods for logically copying data is that they are resumable. To explain further, all successes/failures are tracked. As such, in case of abnormal termination or exit during the automated execution of the logical data copy, the logical data copy can resume or restart from where it left off. In other words, the logical data copy process is "resumable" in that it can start from any point it terminates at and does not need to start from beginning.

Figure 2A:
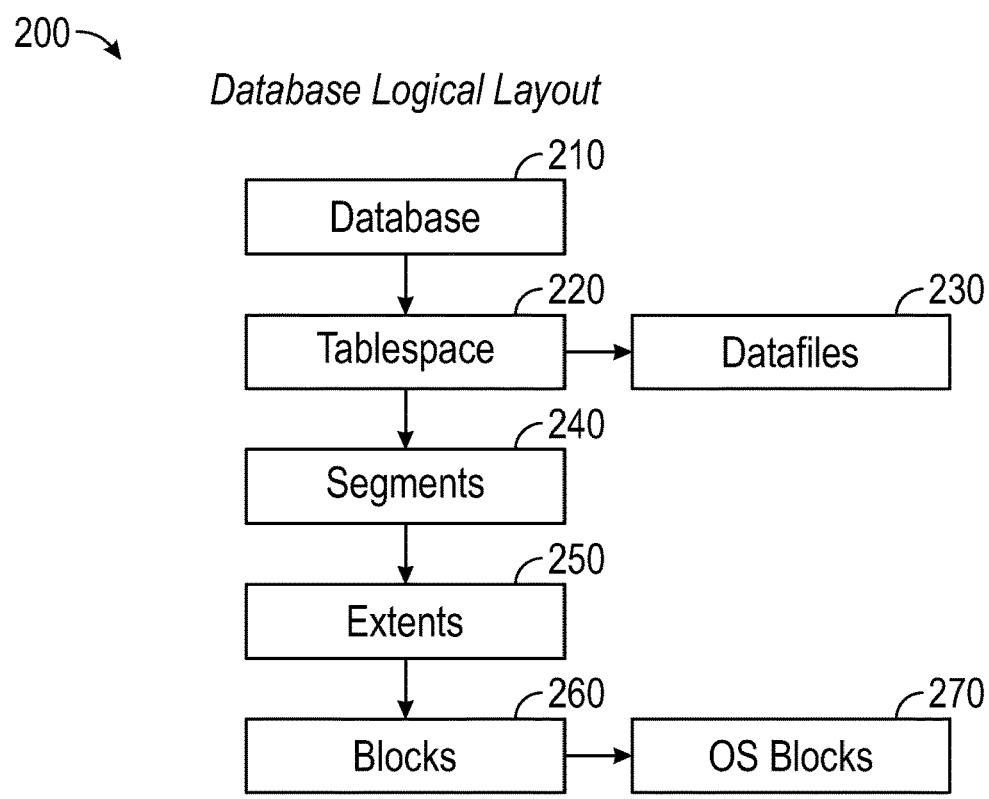
FIG. 2A is a block diagram that illustrates a logical layout or logical structure of a database in accordance with the disclosed embodiments.

FIG. 2A is a block diagram that illustrates a logical layout or logical structure 200 of a database 210 in accordance with one non-limiting implementation. In some database systems, data is stored logically in one or more tablespaces and physically in datafiles associated with the corresponding tablespaces. The tablespaces collectively store all of the database's data. In other words, a database includes one or more tablespaces. As shown in FIG. 2A, one-possible non-limiting implementation of a database 210 that can be logically divided into one or more tablespaces 220, where each tablespace 220 is a container for one or more datafiles 230 that physically store data of the database. Each datafile 230 is assigned to a tablespace. A tablespace can refer to a logical space or "division" within the database required to store data (e.g., a logical unit of database storage). Stated differently one or more datafiles form a logical unit of database storage called a tablespace. A tablespace links the physical storage layer (e.g., files on disks) and the logical storage layer (e.g., tables, indexes).

A datafile 230 is an operating system file that conforms to an operating system, and is used to store data (e.g., a datafile is a physical structure/entity where the data is stored physically). For example, the data of logical data structures, such as tables and indexes, is stored in datafiles 230 of the database. Collectively, the database's data is stored in the datafiles 230.

Each datafile 230 can have one or more table segments 240. A table segment 240 can be a partitioned table or a non-partitioned table. Each table segment 240 is a set of extents 250 that contains all the data for a specific logical storage structure within a tablespace (e.g., that have been allocated for a certain logical data structure, and that all are stored in the same tablespace). For example, for each table 220, one or more extents 250 can be allocated to form a table segment 240 (also referred to as a data segment) for that table, and for each index, one or more extents can be allocated to form an index segment. For example, data for each table (or each partition of a table) can be stored in its own data table segment 240, while each data for each index can be stored in its own index table segment 240. An extent represents continuous data blocks 260 that are used to store specific data information. A data block 260 represents specific number of bytes of physical database space 270 on disk or OS blocks.

Figure 2B:
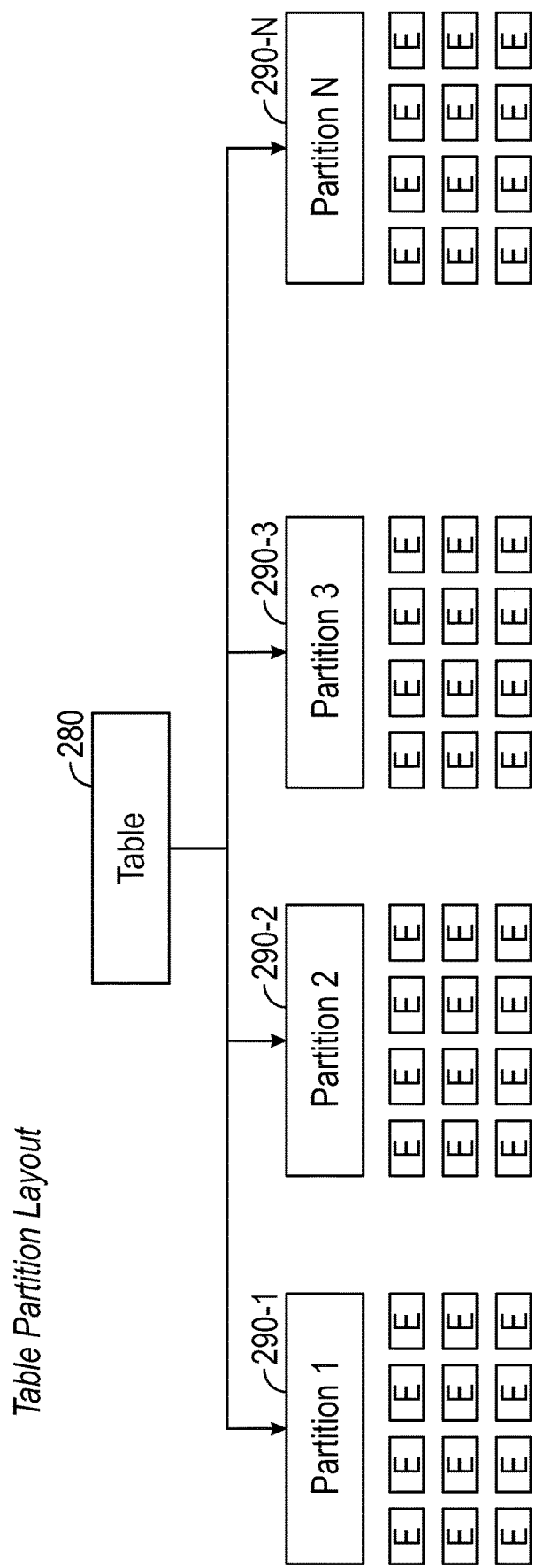
FIG. 2B is a block diagram that illustrates partitioning of a table in accordance with the disclosed embodiments.

FIG. 2B is a block diagram that illustrates partitioning of a table 280 in accordance with an embodiment. Partitioning allows the table 280 to be subdivided into smaller pieces, where each piece of such a database object is called a partition 290-1 . . . 290-N. Each partition 290-1 . . . 290-N has its own name, and may optionally have its own storage characteristics. Within each partition, there can be multiple extents within that partition (as illustrated by smaller squares under each of the partitions 290-1 . . . 290-N).

In accordance with the disclosed embodiments, a logical copy system and methodologies are provided for copying data from a source database 110 to two or more target databases 120. In one embodiment, a RowID based or logical copy methodology is provided that allows for data to be copied to multiple targets in a fast and efficient way by copying only "necessary" data (e.g., actual database data from the source database 110). By doing so, the overall migration time (including customer downtime) can be drastically reduced. In general terms, the RowID based copy method is a purely logical copy that: splits all table data into extent chunks and then copies them in parallel to target using multi-threading. This way only "necessary" partition data (as defined using partition input arguments) needs to be copied, as opposed to all data. This solution will work for all table objects (e.g., Large OBjects (LOBs) that can contain both complex structured and unstructured data, NON-LOBs or normal tables other than LOB tables, etc.).

Figure 3A:
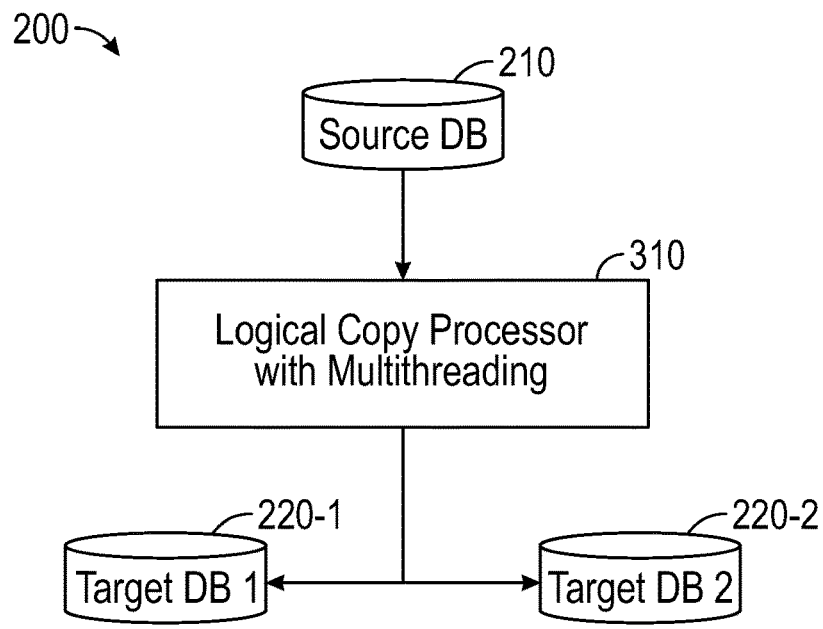
FIG. 3A is a system that illustrates a logical copy processor for copying data from a source database to two or more target databases in accordance with the disclosed embodiments.
Figure 3B:
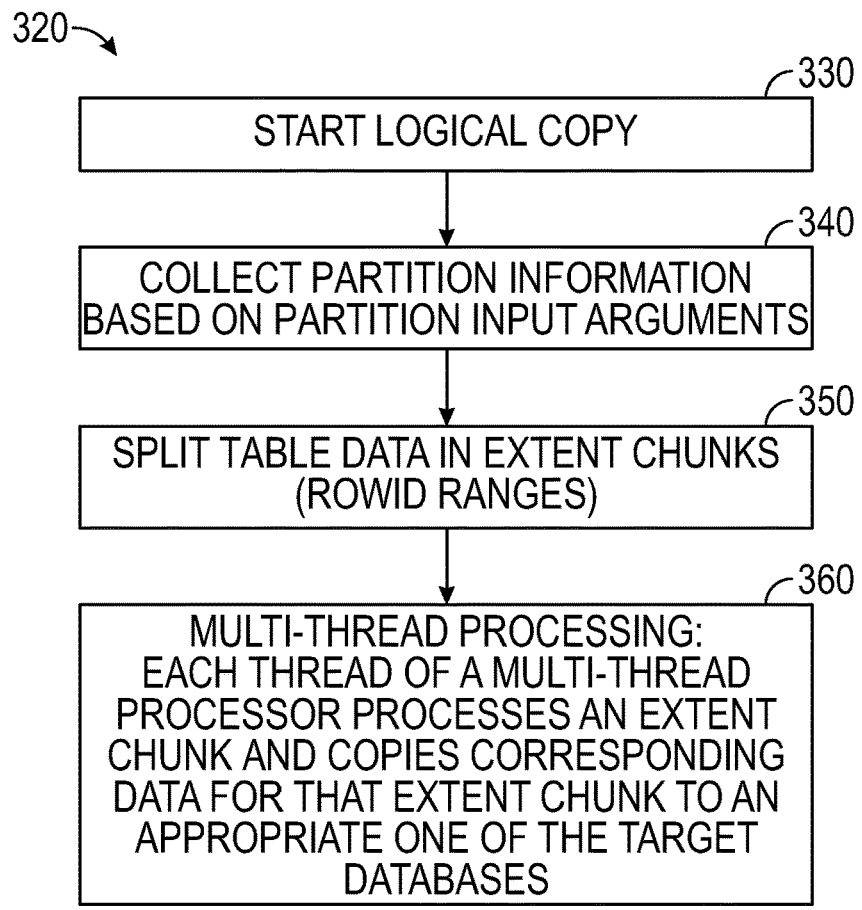
FIG. 3B is a flowchart that illustrates a logical copy method performed by the logical copy processor of FIG. 3A for copying data from a source database to two or more target databases in accordance with the disclosed embodiments.

FIG. 3A is a system that illustrates a logical copy processor 310 for copying data from a source database 110 to two or more target databases 120 in accordance with the disclosed embodiments. FIG. 3B is a flowchart that illustrates a logical copy method 320 performed by the logical copy processor 310 of FIG. 3A for copying data from a source database 110 to two or more target databases 120 in accordance with the disclosed embodiments. FIG. 3A will be described below in conjunction with FIG. 3B.

In one embodiment, the logical copy method 320 starts at step 330, where the logical copy processor 310 is provided with connectivity information for the source database 110, the first target database 120-1 (target database 1) and the second target database 120-2 (target database 2). This connectivity information is used to establish a connection between the source database 110 and the target databases 120. For each database, this connectivity information can include: the database name, the database hostname, the database port, the database username and the database password. In addition, the logical copy processor 310 is also provided with partition information regarding which sets of partitions from the source database 110 are to be copied to the first target database 120-1 (target database 1), and which sets of partitions from the source database 110 are to be copied to the second target database 120-2 (target database 2).

The logical copy method 320 then proceeds to step 340, where the logical copy processor 310 can collect partition information based on table partition input arguments. For example, in one implementation, at step 340, table partition information is collected based on partition input arguments for the RowID Copy automation (e.g., partition numbers input by human such as an administrator). The logical copy processor 310 can query the source database 110 and collect partition metadata information. The logical copy processor 310 can store the partition metadata information in the target databases 120 (target database 1 120-1 and target database 2 120-2). Hence it only contains required partition metadata information on each target database 120. This partition metadata information can include at least: table name, partition name, object ID, file number, block number, row number, etc. One implementation of step 340 will be described below with reference to FIG. 4.

The logical copy method 320 then proceeds to step 350, where the logical copy processor 310 can split table data in extent chunks (also referred to herein as RowID ranges). Each extent chunk can include a set or group of extents specified by a range of row identifiers (RowIDs). For example, in one implementation of step 350, extent chunks (RowID ranges) are created using metadata information collected (at step 340) on the target database side. For instance, in one implementation, the extent chunks (RowID ranges) can be created using partition metadata information that was collected and stored in the target databases 120 (e.g., target database 1 120-1 and target database 2 120-2) at step 340. One implementation of step 350 will be described below with reference to FIG. 6.

At step 360, a RowID copy process is performed, where data is copied per the extent chunks (RowID ranges) that were created as part of step 350. For example, in one implementation of step 360, multi-thread processing can be performed, where each thread of a multi-thread processor processes an extent chunk and copies corresponding data for that extent chunk to an appropriate one of the target databases. Each extent chunk can include a set or group of extents (described above with reference to FIGS. 2A and 2B) specified by a range of row identifiers (RowIDs). This way, the corresponding data for each extent chunk can be copied to an appropriate one of the target database, while other threads copy corresponding data for each of the other extent chunks to an appropriate one of the target databases in parallel. One specific implementation of step 360 will be described below with reference to FIG. 7.

Figure 4:
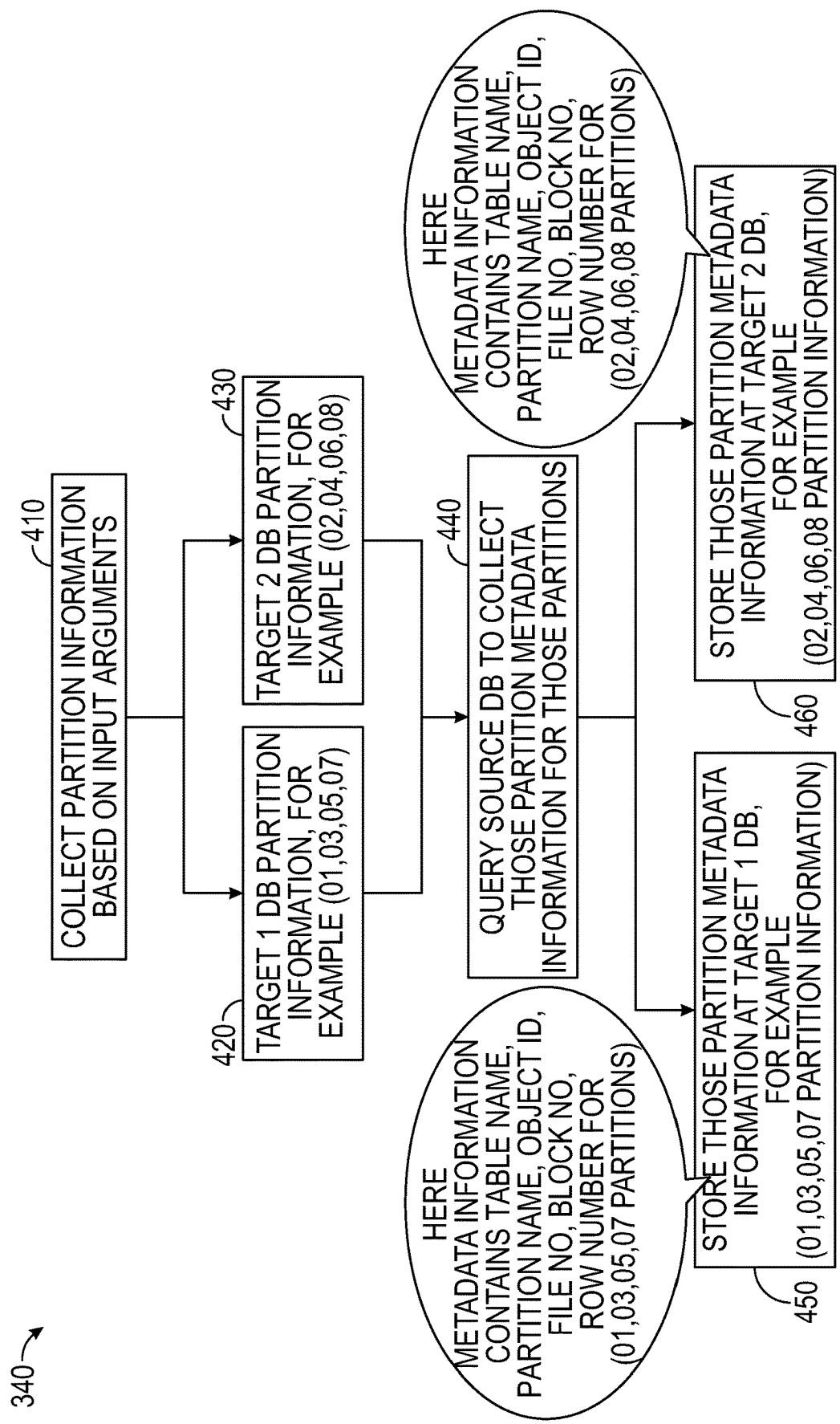
FIG. 4 is a flowchart that illustrates a method performed by the logical copy processor of FIG. 3A for collecting partition information based on the partition input arguments in accordance with the disclosed embodiments.

FIG. 4 is a flowchart that illustrates a method 340 performed by the logical copy processor 310 of FIG. 3A for collecting partition information based on the partition input arguments in accordance with the disclosed embodiments. In this non-limiting example, FIG. 4 explains details about how partition information is collected based on partition input arguments, and how that partition information can then be used to collect the partition metadata information for target database 1 120-1 and target database 2 120-2. In this simplified example, the partition input arguments specify that partition numbers 01, 03, 05, 07 will be assigned to the first target database 1 120-1 and that partition numbers 02, 04, 06, 08 will be assigned to the second target database 2 120-2

FIG. 5 is a database logical structure 500 that illustrates a RowID format that includes some of the partition metadata information in accordance with the disclosed embodiments. As shown in FIG. 5, the RowID format can include: data object ID (column 510), file number (column 520), block number (column 530) and row number (column 540).

FIG. 6 is a method 600 for creating RowID ranges in accordance with the disclosed embodiments. In one implementation, a RowID range creation algorithm 600 (e.g., in SQL) is provided for creating extent chunks for each partition of a table (see FIG. 2B). In this non-limiting example, it is assumed that there are a maximum of 10,000 rows (maximum value) in a given block, but the maximum number of rows in a given block can vary depending on the implementation. Each extent chunk is specified by a range of row IDs, or "RowID range," that can be specified using two values: a Start_RowID, which may be created or computed using code 610, and an End_RowID, which may be created or computed using code 620. An extent chunk can be created for each and every table/partition. As described above with reference to step 360, the extent chunk values (or RowID Ranges) can then be used query the source database 110 and get the data for each of the target databases 120.

Figure 7:
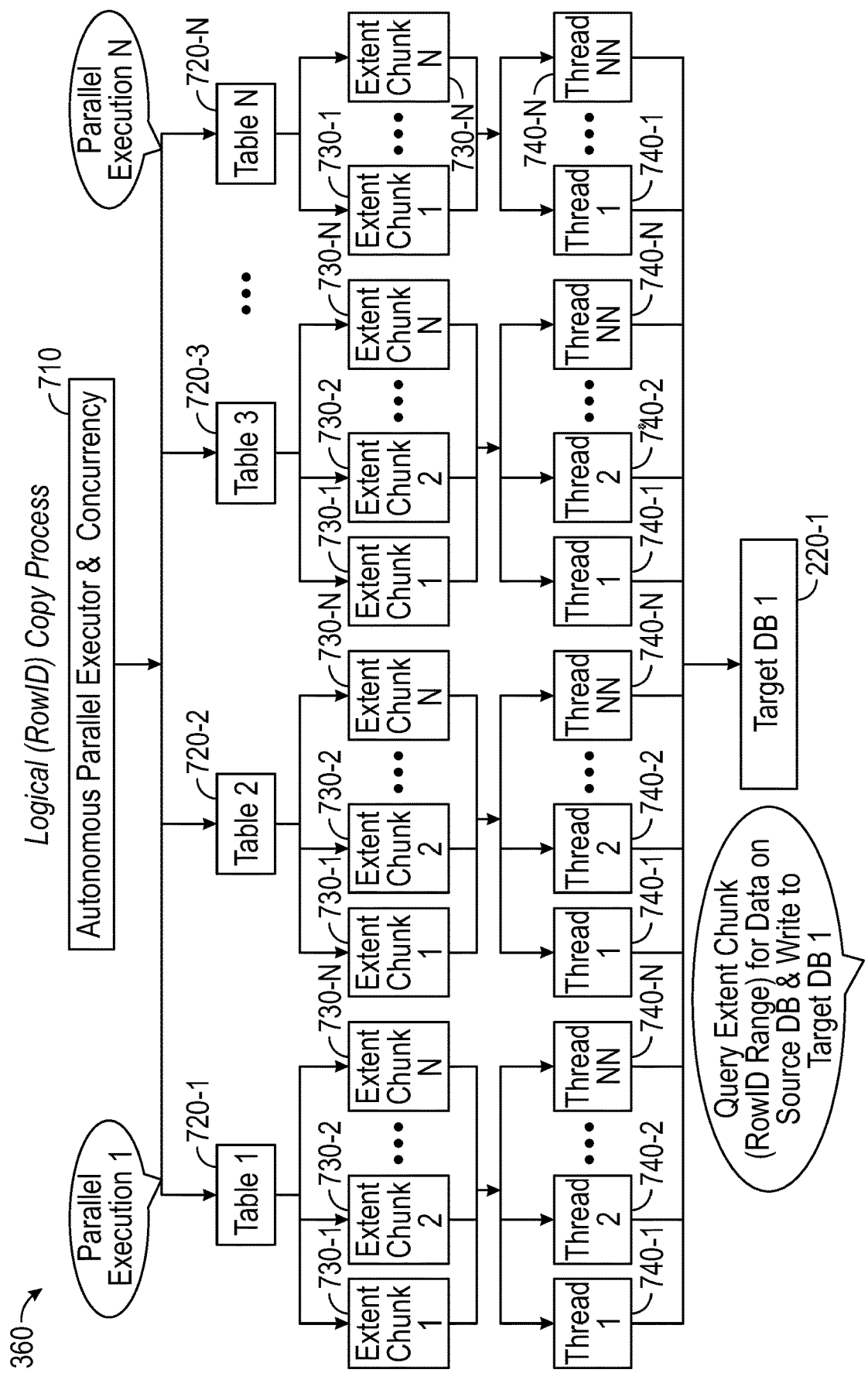
FIG. 7 is a flowchart that illustrates a RowID copy method performed by a parallel executor of the logical copy processor of FIG. 3A in accordance with the disclosed embodiments.

FIG. 7 is a flowchart that illustrates a logical RowID copy method 360 performed by a parallel executor 710 of the logical copy processor 310 of FIG. 3A in accordance with the disclosed embodiments. In this non-limiting example, FIG. 7 explains how an autonomous parallel executor 710 concurrently copies appropriate data to the first target database 1 120-1; however, it should be appreciated that another instance of the parallel executor 710 can also copy appropriate data to the second target database 2 120-2 at the same time. In this example, the parallel executor 710 can process a set of tables 720-1 . . . 720-4 and related extent chunks (RowID Ranges) 730-1 . . . 730-N of each table 720, and start copying them in parallel to the first target database 1 120-1 using multi-threading. In this example, each thread 740 of a multi-thread processor can process and copy one of the extent chunks 730 to the first target database 1 120-1. This way, data for each table 720 (e.g., even Terabytes of data) can be copied to the first target database 120-1 in a faster and more efficient way. Less data is copied from source database to each target database (e.g., only necessary data for each target database). The rate at which it is copied is faster because extent chunks 730-1 . . . 730-N of each table 720 are processed in parallel using multi-thread processing, which helps increase speed. Thus, this logical RowID copy method 360 is very fast when compared to other copy methodologies.

The following description is of one example of a system in which the features described above may be implemented. The components of the system described below are merely one example and should not be construed as limiting. The features described above with respect to FIGS. 1-7 may be implemented in other types of computing environments, such as one with multiple databases, a multi-tenant database system environment, a single-tenant database system environment, or some combination of the above.

Figure 8:
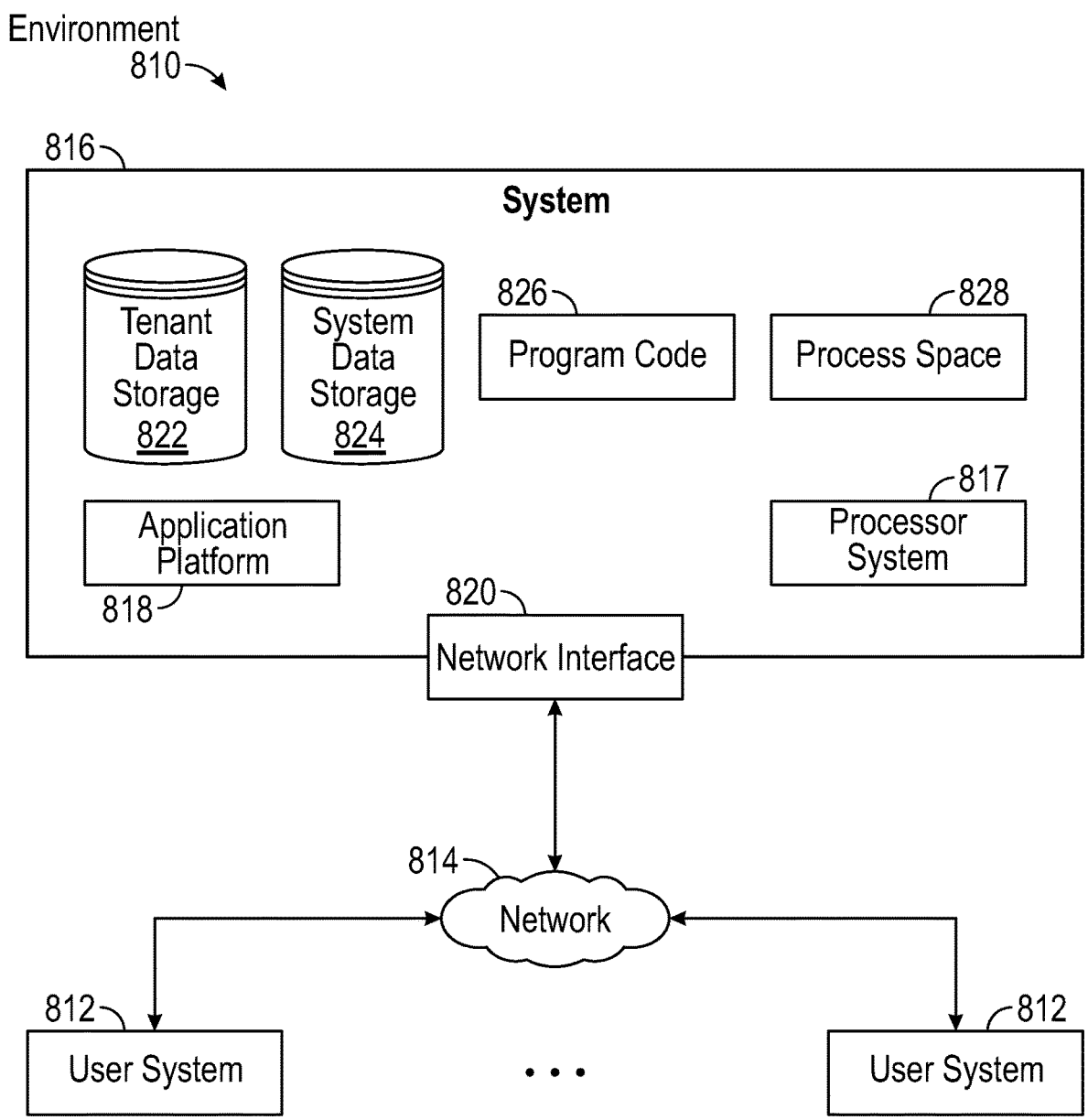
FIG. 8 shows a block diagram of an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818.

The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
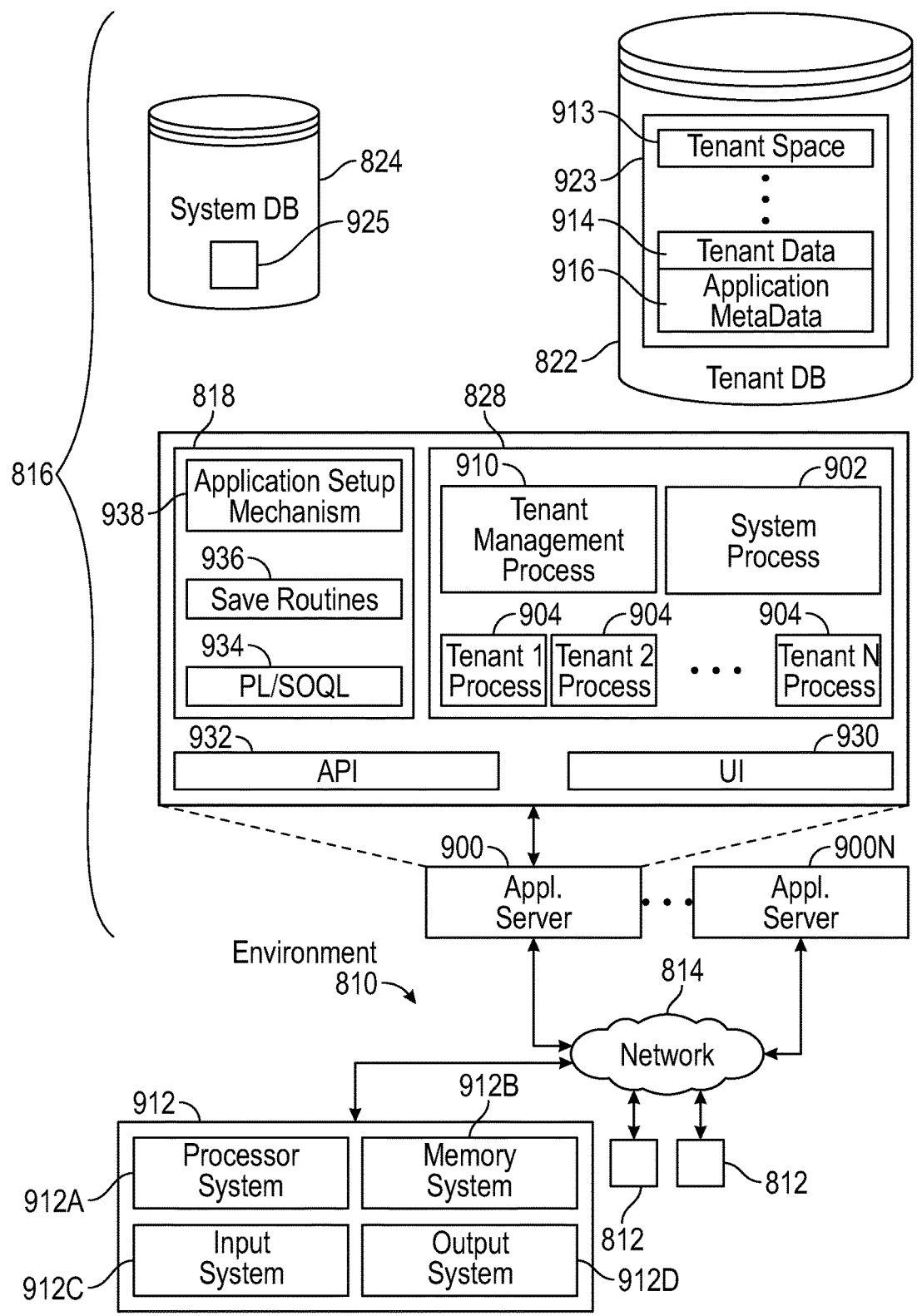
FIG. 9 shows a block diagram of example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 410, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 420 of FIG. 8 is implemented as a set of HTTP application servers $900_1$-$900_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server 900₁ can be coupled via the network 814 (for example, the Internet), another application server 900_N can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
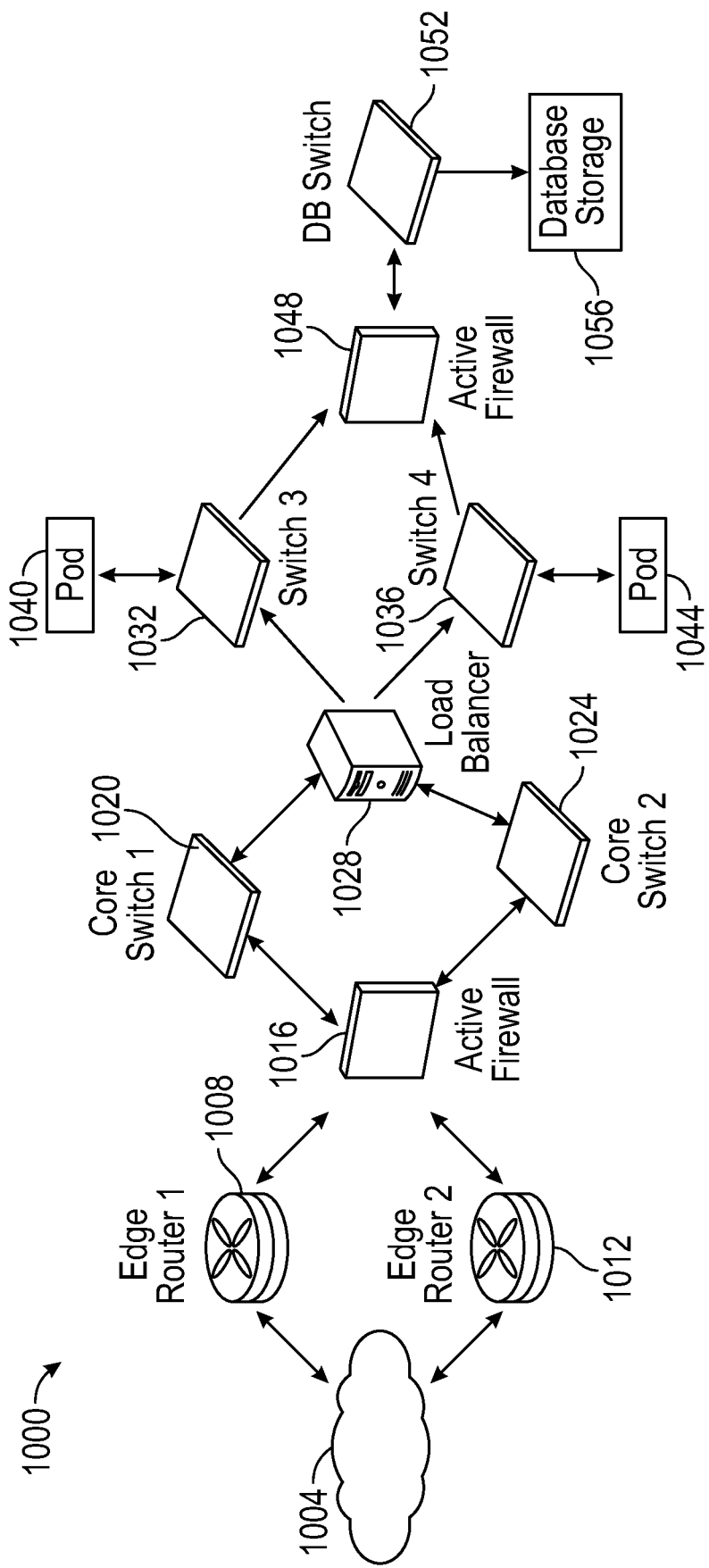
FIG. 10A shows a system diagram illustrating example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
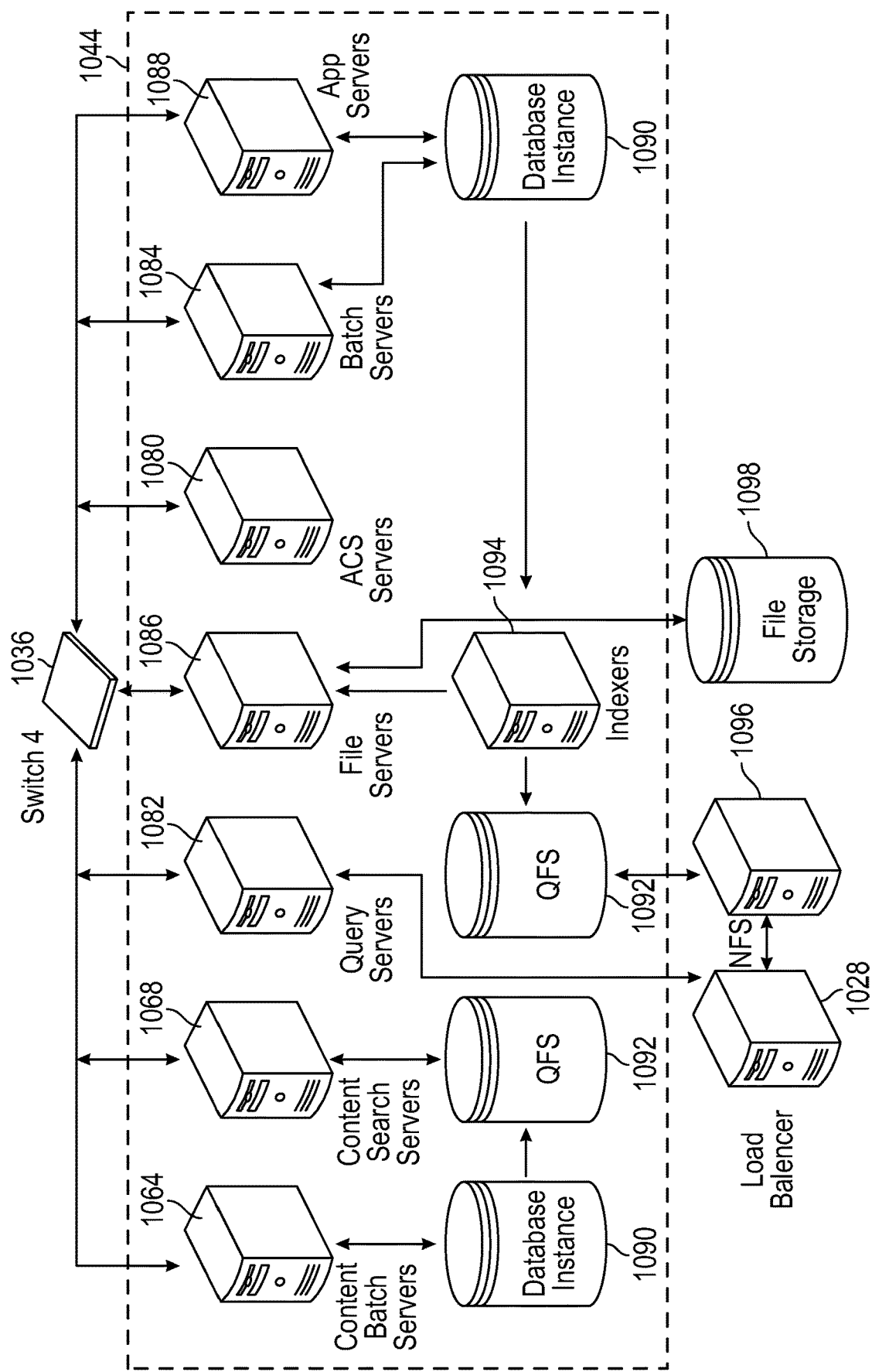
FIG. 10B shows a system diagram further illustrating example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
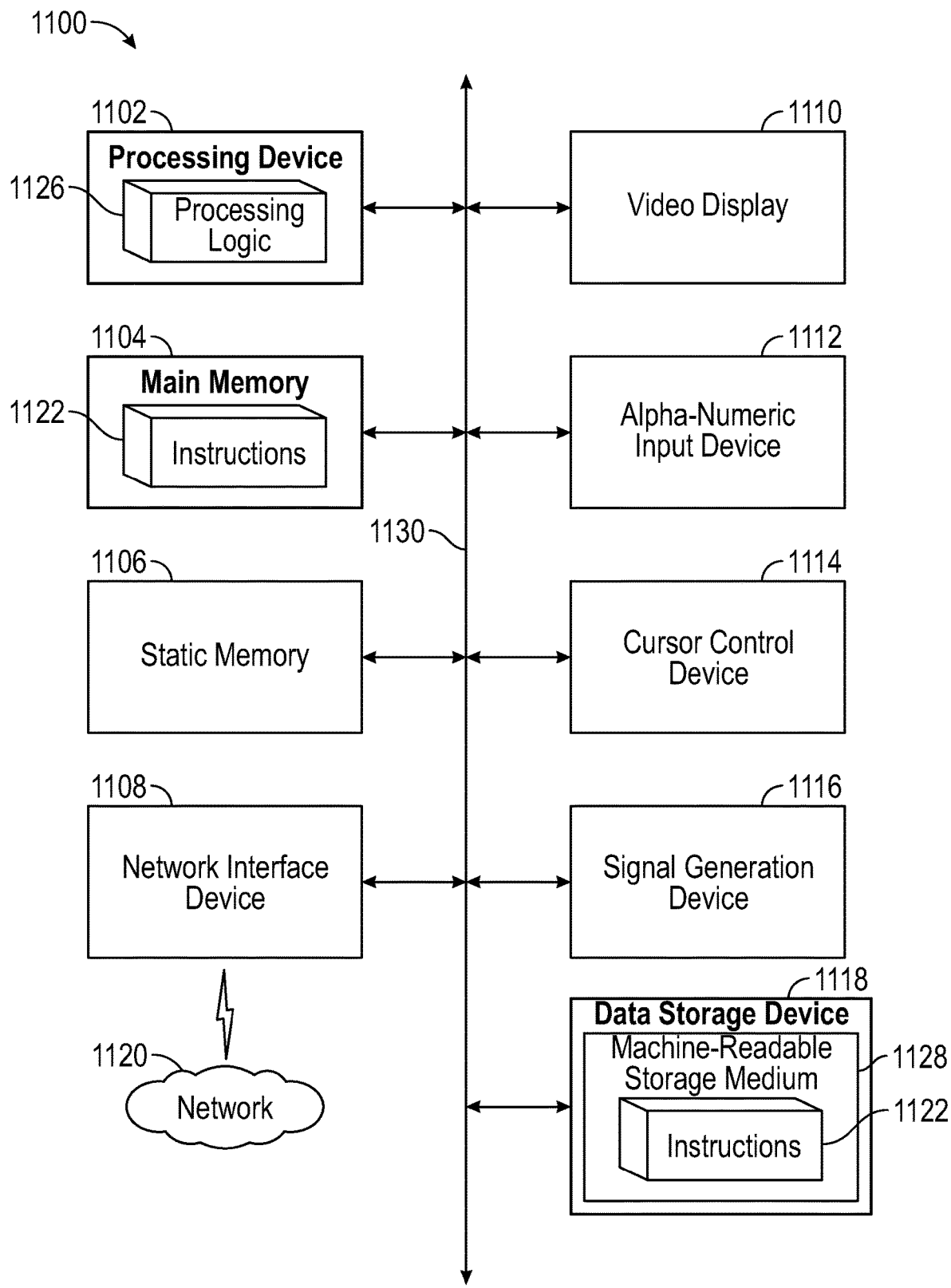
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "identifying," "adding," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for logically copying data from a source database to a first target database and a second target database, the method comprising:
    collecting, via a processor based on partition input arguments, table partition information that indicates a first set of partitions from the source database that are to be copied to the first target database and a second set of partitions from the source database that are to be copied to the second target database;
    querying the source database, via the processor based on the table partition information, to collect partition metadata information;
    storing a first set of the partition metadata information for the first set of partitions, and a second set of the partition metadata information for the second set of partitions;
    creating, based on the partition metadata information, at least one extent chunk for each partition of a table;
    at the first target database: querying the source database for a first set of data based on a first set of extent chunks, and writing the first set of data to the first target database; and
    at the second target database: querying the source database for a second set of data based on a second set of extent chunks, and writing the second set of data to the second target database.

2. The method according to claim 1, wherein creating comprises:
    for each of the first set of partitions: creating the first set of extent chunks based on the first set of the partition metadata information; and
    for each of the second set of partitions: creating the second set of extent chunks based on the second set of the partition metadata information,
    wherein each extent chunk comprises a group of extents specified by a range of row identifiers (IDs) that is specified by a value of a starting row identifier and a value of an ending row identifier for that extent chunk.

3. The method according to claim 1, wherein the source database comprises a table having a plurality of partitions, and wherein the partition input arguments comprise:
    a first set of partition numbers that will be assigned to the first target database; and a second set of partition numbers that will be assigned to the second target database.

4. The method according to claim 1, wherein each instance of the partition metadata information comprises: a table name, a partition name, an object ID, a file number, a block number, and a row number.

5. The method according to claim 1, wherein each extent chunk comprises a group of extents specified by a range of row identifiers (IDs) that is specified by a value of a starting row identifier and a value of an ending row identifier for that extent chunk, and wherein each row identifier has a format comprising: an object ID, a file number, a block number, and a row number.

6. The method according to claim 2, wherein creating, based on the partition metadata information, at least one extent chunk for each partition of a table, comprises:
    computing a value of the starting row identifier for that extent chunk; and
    computing a value of the ending row identifier for that extent chunk.

7. The method according to claim 1, wherein each table of a first set of tables has a subset of related extent chunks from the first set of extent chunks, and wherein querying the source database for the first set of data from the source database based on the first set of extent chunks; and writing the first set of data to the first target database, comprises:
    for each table of the first set of tables: processing, via a thread of a multi-thread processor, each related extent chunk of the subset of related extent chunks associated with that table by:
    querying the source database for particular data in a range of row identifiers specified by that related extent chunk; and
    writing the particular data to the first target database.

8. The method according to claim 7, wherein the processing collectively comprises:
    multi-thread processing all of the first set of extent chunks in parallel to copy the first set of data from the source database to the first target database,
    wherein the first set of data from the source database comprises all of the particular data in the range of row identifiers specified by each related extent chunk of the subset of related extent chunks.

9. A system comprising at least one hardware-based processor and memory, wherein the memory comprises processor-executable instructions encoded on a non-transient processor-readable media, wherein the processor-executable instructions, when executed by the hardware-based processor, are configurable to cause:
    logically copying data from a source database to a first target database and a second target database, the logically copying data comprising:
        collecting, via the processor based on partition input arguments, table partition information that indicates a first set of partitions from the source database that are to be copied to the first target database and a second set of partitions from the source database that are to be copied to the second target database;
        querying the source database, via the processor based on the table partition information, to collect partition metadata information;

storing a first set of the partition metadata information for the first set of partitions at the first target database;

storing a second set of the partition metadata information for the second set of partitions at the second target database;

creating, based on the partition metadata information, at least one extent chunk for each partition of a table;

at the first target database: querying the source database for a first set of data from the source database based on a first set of extent chunks, and writing the first set of data to the first target database; and at the second target database: querying the source database for a second set of data from the source database based on a second set of extent chunks, and writing the second set of data to the second target database.

10. The system according to claim 9, wherein creating comprises:

for each of the first set of partitions: creating the first set of extent chunks based on the first set of the partition metadata information; and for each of the second set of partitions: creating the second set of extent chunks based on the second set of the partition metadata information, wherein each extent chunk comprises a group of extents specified by a range of row identifiers (IDs) that is specified by a value of a starting row identifier and a value of an ending row identifier for that extent chunk.

11. The system according to claim 9, wherein the source database comprises a table having a plurality of partitions, and wherein the partition input arguments comprise:

a first set of partition numbers that will be assigned to the first target database; and a second set of partition numbers that will be assigned to the second target database.

12. The system according to claim 9, wherein each instance of the partition metadata information comprises: a table name, a partition name, an object ID, a file number, a block number, and a row number.

13. The system according to claim 9, wherein each extent chunk comprises a group of extents specified by a range of row identifiers (IDs) that is specified by a value of a starting row identifier and a value of an ending row identifier for that extent chunk, and wherein each row identifier has a format comprising: an object ID, a file number, a block number, and a row number.

14. The system according to claim 10, wherein creating, based on the partition metadata information, at least one extent chunk for each partition of a table, comprises:

computing a value of the starting row identifier for that extent chunk; and computing a value of the ending row identifier for that extent chunk.

15. The system according to claim 9, wherein each table of a first set of tables has a subset of related extent chunks from the first set of extent chunks, and wherein querying the source database for the first set of data from the source database based on the first set of extent chunks; and writing the first set of data to the first target database, comprises:

for each table of the first set of tables:

processing, via a thread of a multi-thread processor, each related extent chunk of the subset of related extent chunks associated with that table by:

querying the source database for particular data in a range of row identifiers specified by that related extent chunk; and writing the particular data to the first target database.

16. The system according to claim 15, wherein the processing collectively comprises:

multi-thread processing all of the first set of extent chunks in parallel to copy the first set of data from the source database to the first target database, wherein the first set of data from the source database comprises all of the particular data in the range of row identifiers specified by each related extent chunk of the subset of related extent chunks.

17. A database migration system comprising at least one hardware-based processor that is configurable to cause logically copying data from a source database to a first target database and a second target database, the logically copying data comprising:

collecting, via a hardware-based processor based on partition input arguments, table partition information that indicates a first set of partitions from the source database that are to be copied to the first target database and a second set of partitions from the source database that are to be copied to the second target database;

querying the source database, via the hardware-based processor based on the table partition information, to collect partition metadata information for the first set of partitions and the second set of partitions;

storing a first set of the partition metadata information for the first set of partitions at the first target database;

storing a second set of the partition metadata information for the second set of partitions at the second target database;

creating, based on the partition metadata information, at least one extent chunk for each partition of a table;

at the first target database: querying the source database for a first set of data from the source database based on a first set of extent chunks, and writing the first set of data to the first target database; and at the second target database: querying the source database for a second set of data from the source database based on a second set of extent chunks, and writing the second set of data to the second target database.

18. The database migration system according to claim 17, wherein the source database comprises a table having a plurality of partitions, and wherein the partition input arguments comprise:

a first set of partition numbers that will be assigned to the first target database; and a second set of partition numbers that will be assigned to the second target database.

19. The database migration system according to claim 17, wherein each instance of the partition metadata information comprises: a table name, a partition name, an object ID, a file number, a block number, and a row number.

20. The database migration system according to claim 17, wherein each extent chunk comprises a group of extents specified by a range of row identifiers (IDs) that is specified by a value of a starting row identifier and a value of an ending row identifier for that extent chunk, and wherein each row identifier has a format comprising: an object ID, a file number, a block number, and a row number.

* * * * *